Figure 1:
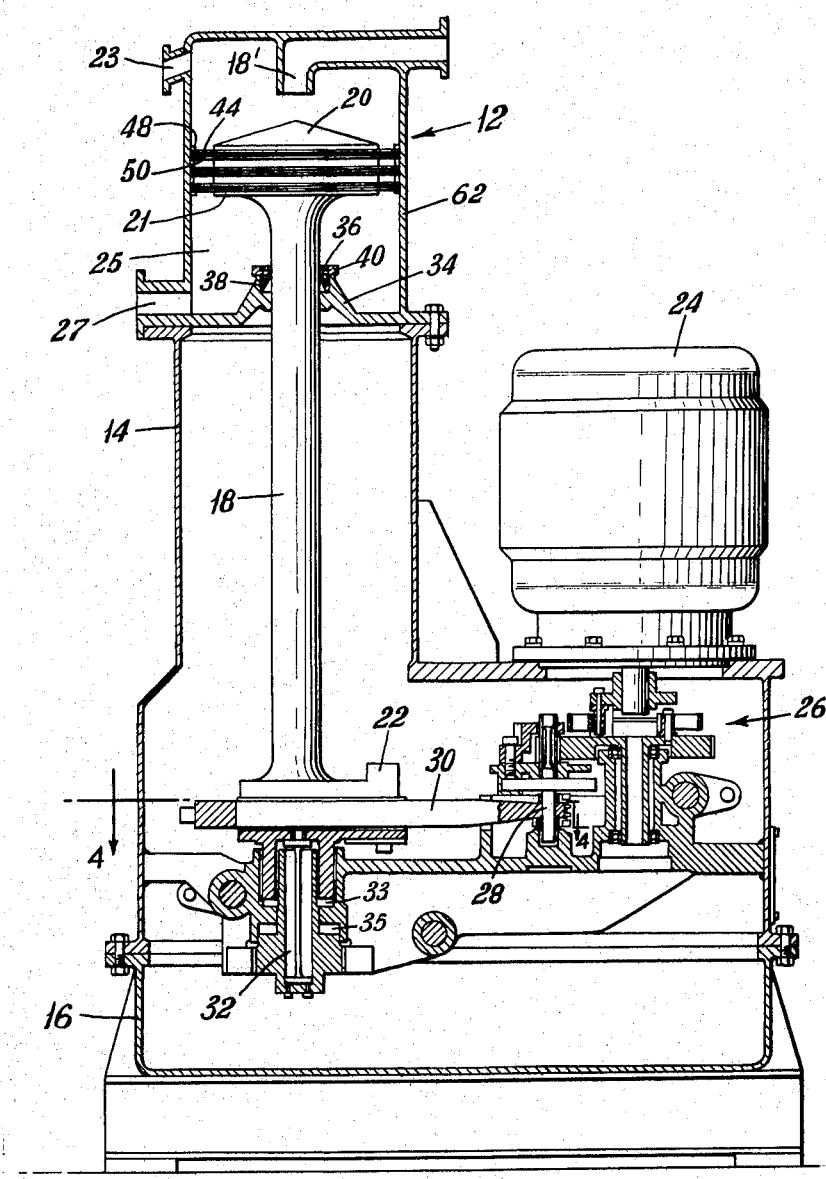

May 17, 1966

C. B. HORSLEY 3,251,576

SONIC REFINING APPARATUS

Filed Oct. 31, 1961

2 Sheets-Sheet 1

INVENTOR.
CAPERTON B. HORSLEY
BY
ATTORNEY

May 17, 1966   C. B. HORSLEY   3,251,576
SONIC REFINING APPARATUS
Filed Oct. 31, 1961   2 Sheets-Sheet 2
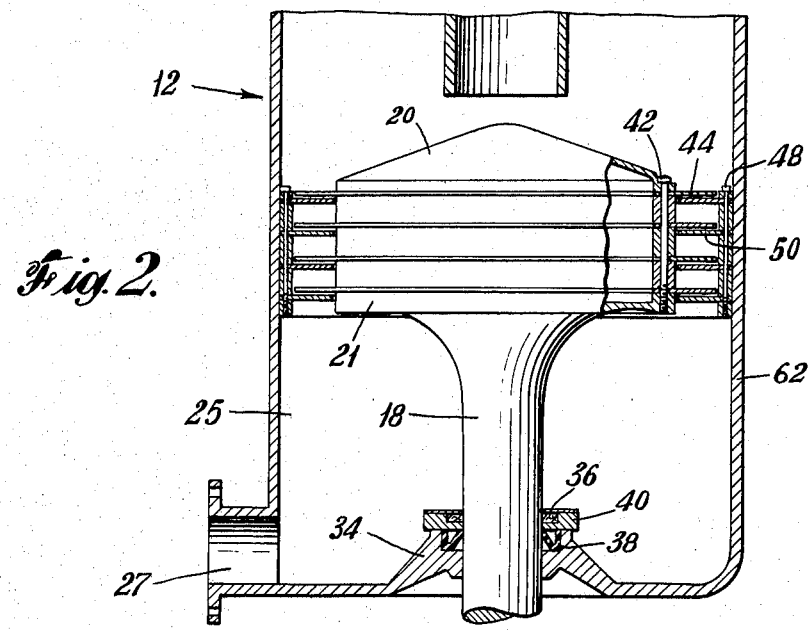
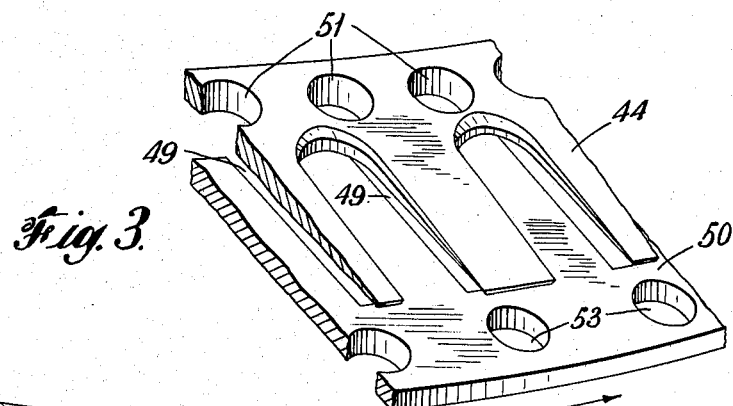
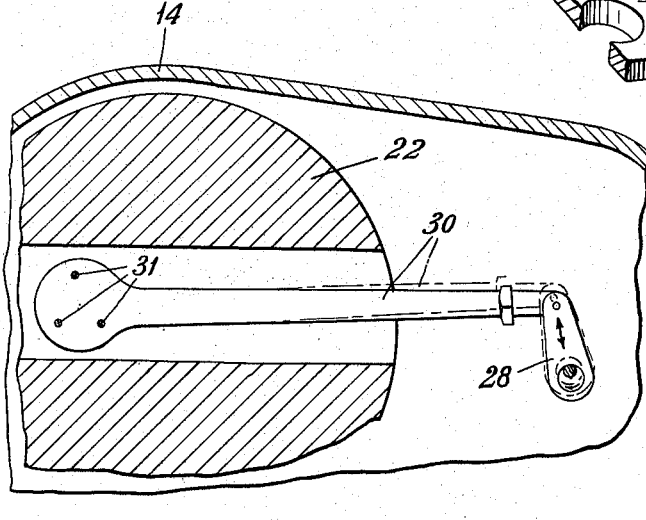
INVENTOR.
CAPERTON B. HORSLEY
BY
ATTORNEY

United States Patent Office 3,251,576
Patented May 17, 1966

3,251,576
SONIC REFINING APPARATUS
Caperton B. Horsley, East Walpole, Mass., assignor to Union Carbide Corporation, a corporation of New York
Filed Oct. 31, 1961, Ser. No. 149,063
6 Claims. (Cl. 259—4)

The present invention relates to vibratory refining apparatus and, more particularly, to apparatus for subjecting liquids, emulsions, hydrosols, slurries, and other mixtures to oscillatory or vibrating effects in order to modify the properties of characteristics of the treated substances. For convenience, the term "fluent materials" will be used herein to refer to the liquids, emulsions, hydrosols, slurries, etc. which are capable of treatment by the inventive apparatus.

When a fluent material is subjected to sound or vibration, it is naturally subjected to alternating pressure and/or alternating acceleration. Where there is alternating acceleration, there is also a periodic displacement of the material, which is generally referred to as particle displacement. If a fluent material in a solid container is subjected to sound or vibration, the fluid touching the wall is restrained by boundary layer friction, whereas the fluid a little further away from the wall tends to move with the adjacent fluid; thus, that portion of the fluid which is close to the walls of the solid container, which are generally parallel to the direction of the particle displacement in the fluid, is subjected to alternating shear.

Heretofore, it has been found that for many desired results in many classes of fluent materials, alternating pressure and acceleration are ineffectual, while the alternating shear produces extraordinarily good results. Accordingly, apparatus has been proposed with a vibratory system in which the factor of alternating shear is enormously emphasized. Such apparatus is disclosed and described in U.S. Patent No. 2,584,053, issued January 29, 1952, and entitled "Means for the Application of Alternating Shear at Sonic Frequencies to the Treatment of Material." The effect of such a system is to obtain far more effective results for the same input power. However, although such apparatus achieves the desired results, it has a very low capacity. In fact, the flow rates of fluent material which the apparatus is capable of handling are usually so low that operation of the apparatus on a commercial scale is uneconomical and impractical.

It is, therefore, the main object of the present invention to provide apparatus for treating fluent materials with intense alternating shear forces and at commercially practical flow rates.

It is another object of the invention to provide such an apparatus wherein the alternating shear stress gradient is increased.

Other aims and advantages of the invention will be apparent from the following description and appended claims.

In the drawings:
FIG. 1 is a vertical cross-sectional view of a preferred form of the novel refining apparatus with some components shown in elevation;
FIG. 2 is an enlarged vertical cross-sectional view of the refining head shown in FIG. 1;
FIG. 3 is a fragmentary detailed isometric view of a dual blade refining assembly, the double-ended arrow indicating the direction of oscillation of the upper blades; and
FIG. 4 is a fragmentary sectional view taken on line 4–4 of FIG. 1 with the eccentric arm shifted slightly to show the extent of the movement.

In accordance with the present invention, there is provided refining apparatus comprising at least one stationary annular arrangement of blades having intervals between adjacent blades; at least one oscillatable annular arrangement of blades having intervals between adjacent blades, the oscillatable blades radially overlapping the stationary blades in closely spaced relation to the stationary blades; oscillatory driving means in driving connection with the oscillatable blades for oscillating the oscillatable blades at a sonic frequency in a direction generally within the plane of the overlapping blades so that the oscillating blades circumferentially overlap the stationary blades; feed means for presenting unrefined fluent material to one side of the overlapping arrangements of blades; and means for removing refined material from the other side of the overlapping arrangements of blades.

Although it has been previously proposed to employ overlapping sets of oscillating blades in a vibratory system in which the factor of alternating shear is emphasized (see U.S. Patent No. 2,800,228), it has been found that apparatus wherein all the blades are oscillating does not provide sufficiently high stresses in the fibers to effect a complete refining job on most kraft, and some sulphite, pulps. The inventive apparatus increases the alternating shear gradient, and thus the stress, by employing stationary blade arrangements between the oscillating blades. Also, since the stationary member of the refining head is an arrangement of blades rather than a solid annular member, the present apparatus has a vastly improved operating capacity.

The apparatus of the present invention will now be described in more detail by referring to the drawings.

One form of the novel apparatus is shown in FIG. 1. The refining head is indicated generally by the numeral 12. This head is mounted upon a vertically arranged cylindrical casing 14, which in turn is held by a supporting casing 16 enclosing the driving mechanism. Within the head 12 and casings 14 and 16 is mounted a balanced spring-mass torsionally vibratory system comprising a main torsion bar 18 having attached to its upper end a drum 21 and to its lower end a massive inertia counterweight 22. The dimensions and elastic characteristics of the main torsion bar 18 are chosen in relation to the masses of the bodies 21 and 22 so that, taking into account the additional masses of the parts attached to these bodies, such as the refining members described below, and the damping forces exerted by the material being refined, the system will have a predetermined natural frequency of torsional oscillation with the mass 21 oscillating in opposite phase from the mass 22 and at a predetermined amplitude.

One optional form of vibratory drive is hereinafter disclosed and described, but the details thereof do not constitute any novel part of the present invention. Referring again to FIG. 1, an electric motor 24 is connected through a speed increaser 26 to an eccentric 28. A flexible driving connection 30 of somewhat greater elasticity than the main torsion bar 18 connects the eccentric 28 to the counterweight 22, inducing rotational oscillation of the latter. As indicated by the double-ended arrow in FIG. 4, the movement of the eccentric 28 causes transverse oscillatory motion of the end of the flexible rod 30 to which it is linked. Since this flexible driving member is rigidly affixed to the counterweight 22 by three bolts 31, it is clear that continued oscillatory motion of the flexible arm 30 will quickly induce rotational oscillation of the counterweight 22. The oscillations of the counterweight are transmitted through the main torsion bar 18 to the drum 21. It will be evident that by operating the motor 24 at the proper speed with reference to the gearing, the system can be excited through the resilient exciter connection 30 to vibrate at the predetermined natural operating frequency. The inertia forces are balanced since the masses 21 and 22 oscillate in opposite phase, and substantantially the only forces on the bearing of the driving mechanism are due to the refining work done.

The spring-mass assembly comprising the torsion bar 18, the upper mass 21, and the lower mass 22 is preferably supported on the casing 16 by oil pressure in cavities 33 and 35. The oil pressure in the upper cavity 33 acts directly on the lower annular surface of mass 22, while the oil pressure in the lower cavity 35 is transmitted to the spring-mass assembly through a torsionally flexible but axially rigid thrust absorbing connector 32. It is preferable to use a flexible connector of this type to obviate the difficulties of lubrication inherent in a vibratory system wherein the parts do not move in one direction a sufficient distance to carry lubricant to all the surfaces, as in a rotating bearing. The details of this thrust absorbing connection are fully disclosed and described in U.S. Patent No. 2,625,380, issued January 13, 1953, and entitled "Thrust Absorbing Device for Rotationally Oscillating Systems." Consequently, further details thereof will not be set forth in the present specification, since reference may be had to such patent for additional information.

A more detailed description will now be given of the elements enclosed in the refiner head 12 which is the subject of the present invention. It can be seen in FIG. 1 that the main torison bar 18 protrudes through a sealing collar 34. The enlarged cross-sectional view of FIG. 2 illustrates the various sealing components which are held within the collar 34 surrounding the bar 18. These comprise a sealing ring 36 of leather or fibrous material and a second sealing ring 38, of rubber or the like, separated from the ring 36 by the inturned portion of a flange 40 on the sealing collar 34. The purpose of the sealing collar 34 is to prevent the escape downwardly into the casing 14 of any of the refined material where it might interfere with the driving mechanism mounted in the lower portion of the machine, and any other sealing means which accomplishes this purpose may be used.

FIGS. 2 and 3 illustrate the component parts and particular arrangement of the refining head. It can be seen that the annular space between the drum 21 and the outer casing 62 is occupied by a series of dual blade refining assemblies comprising an upper ring of blades 44 attached to the periphery of the drum 21 and a lower ring of blades 50 attached to the inner surface of the casing 62. The rings of blades 44 are secured to the drum 21 by means of a series of mounting bolts 42 which fit mounting apertures 51 near the inner circumferential portion of each ring, and the rings of blades 50 are secured to the casing 62 by means of a series of bolts 48 which fit apertures 53 near the outer circumferential portion of each ring. Both the drum 21 and the casing 62 are provided with a series of flanges for holding the rings of blades in closely spaced vertical relation.

The vertical space between the oscillating blades 44 and the stationary blades 50 is determined by the force with which the oscillating blades are pressed toward the stationary blades, the type of fluent material being treated, the consistency of the fluent material, and, to some extent, the rate of flow of the fluent material. The force with which the oscillating blades are pressed toward the stationary blades may be adjusted to provide the vertical spacing required for the desired degree of refining and flow rate and the desired refiner loading (which determines the percentage of full load operation of the driving motor). In most cases, it is preferred to have a vertical spacing between about 0.001 and 0.020 inch. One means for varying the vertical space between the oscillating and stationary blades is shown in FIG. 1. Annular cavities 33 and 35 below the lower mass 22 are filled with oil; by varying the pressure of the oil in these cavities by means of a pump (not shown), the vertical position of the mass 22, the torsion bar 18, the mass 21 and the oscillating blades 44 can be varied to provide the desired vertical spacing between the oscillating blade rings and the stationary blade rings.

As best seen in FIG. 3, the oscillatory blades 44 are wider than the intervals 49 between the stationary blades 50 and are positioned directly over the intervals 49 so as to overlap the edges of blades 50. The lengths of the blades are such that blades 50 closely fit the outer surface of the drum 21 and that blades 44 closely fit the inner surface of the outer casing 62. The lower edges of the oscillatory blades 44 are preferably slightly beveled to retain fibers between the two sets of blades and to prevent the oscillating blades from scraping the stationary blades clean. Each refining opening is of accurately predetermined size and is normal to the direction of vibration. The refining blades may be formed from relatively thin stainless steel plates or other suitably rugged material.

Returning to FIG. 1, a feed pipe 18' is disposed concentrically within the cylindrical casing 62 so that the exit of pipe 18 is directly over the apex of the conical member 20, which is secured to the top of the drum 21. Thus, as the fluent material to be refined is fed into the cylindrical casing 62 through the feed pipe 18', the fluent material flows down over the conical member 20 toward the overlapping arrangements of blades. The flow rate of the feed material is maintained at a rate greater than that which can be passed through the refining assemblies so that part of the fluent material swirls upward as it leaves the conical member 20, thus continuously agitating the material directly above the refining blades. As the fluent material is swirled upward into the annular space between the feed pipe 18' and the cylindrical casing 62, part of the material is discharged through outlet 23 in the casing, and the discharged material is eventually recycled back to the feed pipe 18'. Since the fluent material above the refining blades is constantly being agitated, packing of the material in that space is substantially eliminated. When the blade-supporting drum 21 is oscillated rotationally at a high frequency and with considerable amplitude, the blades 44 oscillate in the direction indicated by the double-ended arrow in FIG. 3 and with ever greater linear amplitude as they extend radially outward from the drum. The forces of acceleration at the blade tips may be of the order of 1,000 G., which is of sufficient magnitude to cause even slurries of fibers which easily pack together to pass through the extremely narrow refining openings. Furthermore, the relative motion between the fluent material to be refined and the refining blades 44 and 50 is substantially only in a direction normal to the refining openings between the oscillating and stationary blades.

Although four dual blade assemblies are shown in the drawings, any desired number of blade sets may be employed. The precise number and size of the blade arrangements depend on the type of material to be treated and the desired capacity. It has been found that the average mean velocity of the centers of the blades (i.e., four times the maximum displacement of the blade center from its mean position multiplied by the frequency) should not be less than about 100 feet per minute. At a frequency of 220 c.p.s. and a blade-tip amplitude of ±0.225 inch, a blade-center velocity of about 985 feet per minute or more is usually desirable. A blade speed of less than 100 feet per minute has very low efficiency, the efficiency increases very sharply from 100 feet per minute to 985 feet per minute, and above about 985 feet per minute the efficiency increases at a slower rate. In the case of most pulps, speeds of 650 to 1000 feet per minute seem to produce excellent results and efficiency. The fluent material to be refined is fed through the inlet pipe 18' onto the conical member 20 and starts to pass through the narrow refining openings defined by the oscillatory blades 44 and the stationary blades 50. Partially refined material emerges from the bottom of the first dual blade assembly and passes through the next assembly, and so on until the refined product emerges into the annular space 25 between the torsion bar 18 and the cylindrical casing 62 and is discharged through outlet 27. In the case of some fluent materials, such as extremely viscous material, the space 25 is made large enough that a head space of air is constantly maintained directly below the bottom blade assembly. However, in other cases it is desirable to maintain space 25 completely filled with the refined material, i.e., with no head space of air. The size of the space 25 is determined mainly by the flow rate of material through the refining assemblies and the size of outlet 27. Escape of refined material in a downward direction is prevented by sealing rings 36 and 38.

The axial distance between the oscillating and stationary blades is preferably between about one thousandth and twenty thousandths of an inch, depending on the force with which the oscillating blades are pressed toward the stationary blades, the consistency of the pulp slurry, the nature of the pulp, and the desired flow rate. By varying the force with which the oscillating blades are pressed toward the stationary blades and the pulp consistency, almost any desired peak stress on the fibers can be obtained. Moreover, it appears that when fibers have passed through one pair of the oscillating and stationary blade arrangements, each fiber has been subjected to substantially the same treatment as every other fiber.

In an example of the inventive apparatus, unbleached Chesapeake kraft pulp was processed in a refiner head having seven pairs of oscillating and stationary blades. The differential oil pressure in the bottom cavities was about 280 p.s.i., the frequency was about 220 c.p.s., the blade-tip amplitude was ±0.225 inch, and the average mean velocity of the centers of the oscillating blades was about 985 feet per minute. Each annular arrangement of blades contained 72 equally spaced blades about 0.312 inch in width. The outside diameter of the oscillatory blade arrangements was about 15 inches. The head above the blades was about 18 inches, and the refined pulp was allowed to fall freely from the last pair of blade arrangements. The refined pulp was withdrawn from the machine at a rate of about 95 gallons per minute and was uniformly refined. The best flow rates previously obtainable from sonic refining apparatus under similar conditions with fluent material of the same consistency was between 40 and 60 gallons per minute.

While a presently preferred embodiment of the invention has been herein disclosed and described, it is to be understood that this apparatus is susceptible of numerous modifications and changes within the scope of the appended claims.

What is claimed is:

1. Apparatus for treating material with intense alternating shear forces comprising: at least one stationary annular arrangement of blades having intervals between adjacent blades; at least one oscillatable annular arrangement of blades, said oscillatable blades radially overlapping said stationary blades in closely spaced relation to said stationary blades; oscillatory driving means in driving connection with said oscillatable blades for oscillating said oscillatable blades at a sonic frequency in a direction generally within the plane of said overlapping blades so that the oscillating blades circumferentially overlap the stationary blades; means for exerting pressure on said oscillatable blades in a direction parallel to their axis of rotation and toward said stationary arrangement to increase the alternating shear gradient; feed means for presenting unrefined material to one side of the overlapping arrangements of blades; and means for removing refined material from the other side of said overlapping arrangements of blades.

2. Apparatus for treating fluent material with intense alternating shear forces comprising: a stationary supporting means; at least one annular arrangement of blades having intervals between adjacent blades rigidly affixed to said supporting means; an oscillatable member having a predetermined mass; at least one annular arrangement of blades having intervals between adjacent blades rigidly affixed to said oscillatable member so as to radially overlap the stationary blades in closely spaced relation to the stationary blades; oscillatory driving means in driving connection with said oscillatable member for oscillating said member and said blades affixed thereto at a sonic frequency in a direction generally within the plane of the overlapping blades so that the oscillating blades circumferentially overlap the stationary blades; means for exerting pressure on the oscillatable blades in a direction parallel to their axis of rotation and toward the stationary blade arrangement to increase the alternating shear gradient; feed means for presenting unrefined material to one side of the overlapping arrangements of blades; and means for removing refined material from the other side of the overlapping arrangements of blades.

3. Apparatus for treating fluent material with intense alternating shear forces comprising: a stationary annular supporting means; at least one annular arrangement of radially inward extending blades having intervals between adjacent blades rigidly affixed to the inner surface of said supporting means; a cylindrical oscillatable member disposed within said supporting means; at least one annular arrangement of radially outward extending blades having intervals between adjacent blades rigidly affixed to the outer rim of said cylindrical member so as to radially overlap said radially inward extending blades in closely spaced relation to said inward extending blades; oscillatory driving means in driving connection with said oscillatable member for oscillating said member and said blades affixed thereto at a sonic frequency in a direction generally within the plane of the overlapping blades so that the oscillating blades periodically overlap the stationary blades circumferentially; means for exerting pressure on the oscillatable blades in a direction parallel to their axis of rotation and toward the stationary blade arrangement to increase the alternating shear gradient; feed means for presenting unrefined material to one side of the overlapping arrangements of blades; and means for removing refined material from the other side of the overlapping arrangements of blades.

4. Apparatus in accordance with claim 3 wherein said radially inward extending blades are wider than the intervals between said radially outward extending blades, and said radially outward extending blades are wider than the intervals between said radially inward extending blades.

5. A refining device comprising: a stationary casing; a massive drum within said casing; a first annular arrangement of blades affixed to the inner surface of said casing; a second annular arrangement of blades affixed to the periphery of said drum in closely spaced, substantially parallel relation to said first arrangement of blades; a torsion bar connected to said drum and a massive counterweight connected to the other end of said bar, said drum, bar, and counterweight comprising a spring-mass vibratory system having a predetermined natural frequency of torsional oscillation with said drum and counterweight oscillating in opposite phase and said second arrangement of blades oscillating in a direction generally within its plane; oscillatory driving means in driving connection with a member of said vibratory system for oscillating said system at said frequency means for exerting pressure on the oscillatable blades in a direction parallel to their axis of rotation and toward the stationary blade arrangement to increase the alternating shear gradient; means associated with said closely spaced arrangements of blades for presenting unrefined material to one side of said arrangements; and means associated with said arrangements for removing refined material from the other side of said arrangements.

6. A refining device comprising; a stationary cylindrical casing; a rotationally oscillatable massive member having a cylindrical surface; at least one stationary annular plate rigidly affixed to the inner surface of said casing and at least one oscillatable annular plate rigidly affixed to said cylindrical surface of said massive member in closely spaced, substantially parallel relation to said stationary annular plate, each of said plates being provided with a series of regularly spaced radially extending blades defining intervals therebetween; a torsion bar connected to said massive member and a massive counterweight connected to the other end of said bar, said massive member, bar and counterweight comprising a spring mass vibratory system having a predetermined natural frequency of torsional oscillation at least within the sonic range with said massive member and counterweight oscillating in opposite phase and said oscillatable annular plate oscillating in a direction generally within its plane; oscillating driving means in driving connection with a member of said vibratory stystem for oscillating said system at said frequency; means for exerting pressure on the oscillatable blades in a direction parallel to their axis of rotation and toward the stationary blade arrangement to increase the alternating shear gradient; means associated with said annular plates for presenting unrefined material to one side of said plate; and means associated with said annular plates for removing refined material from the other side of said plates.

References Cited by the Examiner

UNITED STATES PATENTS

| | | | |
|---|---|---|---|
| 2,584,053 | 1/1952 | Seavey et al. | 259—4 |
| 2,625,380 | 1/1953 | Seavey | 259—4 |
| 2,800,228 | 7/1957 | Horsley et al. | 209—269 |
| 2,840,460 | 6/1958 | Masek et al. | 259—8 X |
| 2,851,256 | 9/1958 | Andreopoulos et al. | 259—9 |

WALTER A. SCHEEL, *Primary Examiner.*

LEO QUACKENBUSH, *Examiner.*

JOHN M. BELL, *Assistant Examiner.*